United States Patent [19]

Innes

[11] Patent Number: 5,691,871

[45] Date of Patent: Nov. 25, 1997

[54] TEST CIRCUIT FOR ELECTRICAL SWITCHING DEVICE

[75] Inventor: Mark E. Innes, Asheville, N.C.

[73] Assignee: Eaton Corporation, Cleveland, Ohio

[21] Appl. No.: 557,587

[22] Filed: Nov. 14, 1995

[51] Int. Cl.⁶ ............................................. H02H 3/00
[52] U.S. Cl. ............................ 361/96; 361/93; 364/483
[58] Field of Search ........................... 361/93–94, 96, 361/97, 98; 340/664; 324/555–556; 364/481, 483

[56] References Cited

U.S. PATENT DOCUMENTS

| | | | |
|---|---|---|---|
| 4,752,853 | 6/1988 | Matsko et al. | 361/94 |
| 4,760,364 | 7/1988 | Ostby | 335/132 |
| 4,766,273 | 8/1988 | Butterworth et al. | 200/147 R |
| 4,827,369 | 5/1989 | Saletta et al. | 361/96 |
| 4,937,757 | 6/1990 | Dougherty | 364/492 |
| 4,963,846 | 10/1990 | Grunert et al. | 335/42 |
| 5,214,559 | 5/1993 | Zerbian et al. | 361/93 |
| 5,524,083 | 6/1996 | Horne et al. | 364/492 |

*Primary Examiner*—Jeffrey A. Gaffin
*Assistant Examiner*—Michael J. Sherry
*Attorney, Agent, or Firm*—Larry G. Vande Zande

[57] ABSTRACT

A motor starter for an electrical circuit including a power source and a load, includes an electrical contactor having separable contacts for switching an electrical current flowing between the power source and the load, and an operating mechanism responsive to a trip signal for opening and closing the separable contacts; a current sensor for sensing the electrical current flowing between the power source and the load and providing a sensed current value therefrom; and an overload relay including a microcomputer routine for generating the trip signal as a function of a trip current value and at least one of: (a) a test current value, and (b) the sensed current value; and a test routine including at least one of: (a) a first selecting mechanism including a routine for selecting a first predetermined value as the trip current value and a routine for selecting the test current value for use by the microcomputer routine with the trip current value, and (b) a second selecting mechanism for selecting one of at least one second predetermined value, which is different from the first predetermined value, as the trip current value for use by the microcomputer routine with the sensed current value.

21 Claims, 6 Drawing Sheets

TEST CIRCUIT FOR ELECTRICAL SWITCHING DEVICE

BACKGROUND OF THE INVENTION

1. Field of the Invention

This invention relates to a test circuit for an electrical switching device and, more particularly, to a test circuit cooperating with the trip mechanism of an electrical switching device such as a motor starter.

2. Background Information

Electrical switching devices include, for example, circuit switching devices and circuit interrupters such as circuit breakers, contactors, motor starters and motor controllers. Circuit breakers, which are well-known in the art, are generally used to protect electrical circuitry from damage due to an overcurrent condition, such as an overload fault or a relatively high level short circuit condition. Molded case circuit breakers, for example, include at least one pair of separable contacts which are operated either manually by way of a handle disposed on the outside of the case or automatically by way of an internal trip unit in response to an overcurrent condition.

When the circuit breaker is on, a movable contact assembly is in contact with a stationary or fixed contact assembly. The closed contacts conduct a flow of current between a line terminal and a load terminal. When the circuit breaker trips or is switched off, the movable contact assembly is moved away from the fixed contact assembly, thus, interrupting the flow of current between the line and load terminals. Examples of molded case circuit breakers are disclosed in U.S. Pat. Nos. 4,827,369; and 4,963,846.

Some types of circuit breakers include an electro-mechanical trip unit which interrupts current flow in two or more modes of operation. The electro-mechanical trip unit generally senses overload currents of up to about five to six times normal rated current as well as short circuit currents of greater than about ten times normal rated current. Other types of circuit breakers include an electronic trip unit for automatically interrupting the current flow. The electronic trip unit includes current sensors or transformers which respond to an overcurrent condition. When the overcurrent condition is sensed, the current sensors provide a signal to the electronic circuitry within the electronic trip unit which energizes a solenoid. In turn, a plunger of the solenoid engages a trip bar flange and trips the circuit breaker. Still other circuit breakers include a manual pushbutton for manually interrupting the current flow. Whenever the pushbutton is pressed, a plunger associated with the pushbutton engages the trip bar flange and facilitates partial testing of the circuit breaker trip mechanism.

It is known to inject a test current into a circuit breaker in order to trip the circuit breaker and measure the corresponding trip response time. It is also known to use a portable unit or remote station to send a digital test current to a circuit breaker trip unit which compares the digital test current with one of the protection functions of the circuit breaker. It is further known to send a trip signal from the circuit breaker to the portable unit in order to verify the time of the trip function. It is also known to disable the tripping of the circuit breaker separable contacts in response to the digital test current and solely test the circuit breaker electronic trip unit.

Additional types of circuit interrupters include, for example, contactors, motor starters, motor controllers, lighting controllers, other load controllers and other electromechanical switching devices used for controlling a variety of electrical loads. Electromagnetic contactors, for example, include a plurality of movable electrical contacts which are brought into contact with a plurality of fixed electrical contacts to close the contactor. The movable electrical contacts are separated from the fixed contacts to open the contactor. Examples of contactors are disclosed in U.S. Pat. Nos. 4,760,364; and 4,766,273.

A common type of starter for loads such as motors, lighting, and the like, comprises an electromagnetic contactor with an overload relay. In a motor starter, for example, the purpose of the overload relay is to estimate the heat produced in the motor by line current and "trip" or stop the motor if the retained heat exceeds an acceptable level. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ characteristic. When the calculated $I^2t$ value reaches a trip level, the contactor is tripped open to interrupt the flow of current to the load.

Traditional electro-mechanical overload relays provide a test function which releases a mechanical trip mechanism. This feature is used in testing the trip response of the circuit interrupting device, checking for freedom of movement of the movable electrical contacts and checking for welded contacts. However, there is room for improvement.

SUMMARY OF THE INVENTION

The present invention is directed to a motor starter for an electrical circuit including a power source and a load, the motor starter including an electrical contactor mechanism including a separable contact mechanism for switching an electrical current flowing between the power source and the load, and an operating mechanism responsive to a trip signal for opening and closing the separable contact mechanism; a circuit for sensing the electrical current flowing between the power source and the load and providing a sensed current value therefrom; and an overload relay mechanism including a mechanism for generating the trip signal as a function of a trip current value and at least one of: (a) a test current value, and (b) the sensed current value; and also including a test mechanism including at least one of: (a) a first selecting mechanism including a mechanism for selecting a first predetermined value as the trip current value and a mechanism for selecting the test current value for use by the mechanism for generating the trip signal with the trip current value, and (b) a second selecting mechanism for selecting one of at least one second predetermined value, which is different from the first predetermined value, as the trip current value for use by the mechanism for generating the trip signal with the sensed current value.

As another aspect of the invention, a motor starter for an electrical circuit including a power source and a load, includes an electrical contactor mechanism including a separable contact mechanism for switching an electrical current flowing between the power source and the load, and an operating mechanism responsive to a trip signal for opening and closing the separable contact mechanism; a circuit for sensing the electrical current flowing between the power source and the load and providing a sensed current value therefrom; and an overload relay mechanism including a mechanism for generating the trip signal as a function of a trip current value and one of the sensed current value and a test current value, and a test mechanism for selecting the test current value from at least one predetermined value, each of which is different from the trip current value, for use by the mechanism for generating the trip signal with the trip current value.

As a further aspect of the invention, an electrical switching device for an electrical circuit including a power source and a load, includes a separable contact mechanism for switching an electrical current flowing between the power source and the load, with the separable contact mechanism having a closed position and an open position; a mechanism responsive to a trip signal for moving the separable contact mechanism from the closed position to the open position; a circuit for sensing the electrical current flowing between the power source and the load and providing a sensed current value therefrom; a mechanism for generating the trip signal as a function of the sensed current value and one of a predetermined trip current value and a selected trip current value; and a test mechanism for selecting the selected trip current value from at least one predetermined test value, each of which is less than the predetermined trip current value, for use by the mechanism for generating the trip signal with the sensed current value which is less than the predetermined trip current value.

It is an object of the present invention to check the operation of a current sensor of an electrical switching device.

It is another object of the present invention to facilitate the check of the trip point or the trip level of a motor starter.

It is a further object of the present invention to facilitate the check of the $I^2t$ trip response of a motor starter.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

As employed herein, the term "signal" shall expressly include, but not be limited to any input or output utilized for control and/or monitoring such as, for example, analog signals, digital signals, commands, discrete signals, serial signals or serial messages.

Figure 1:
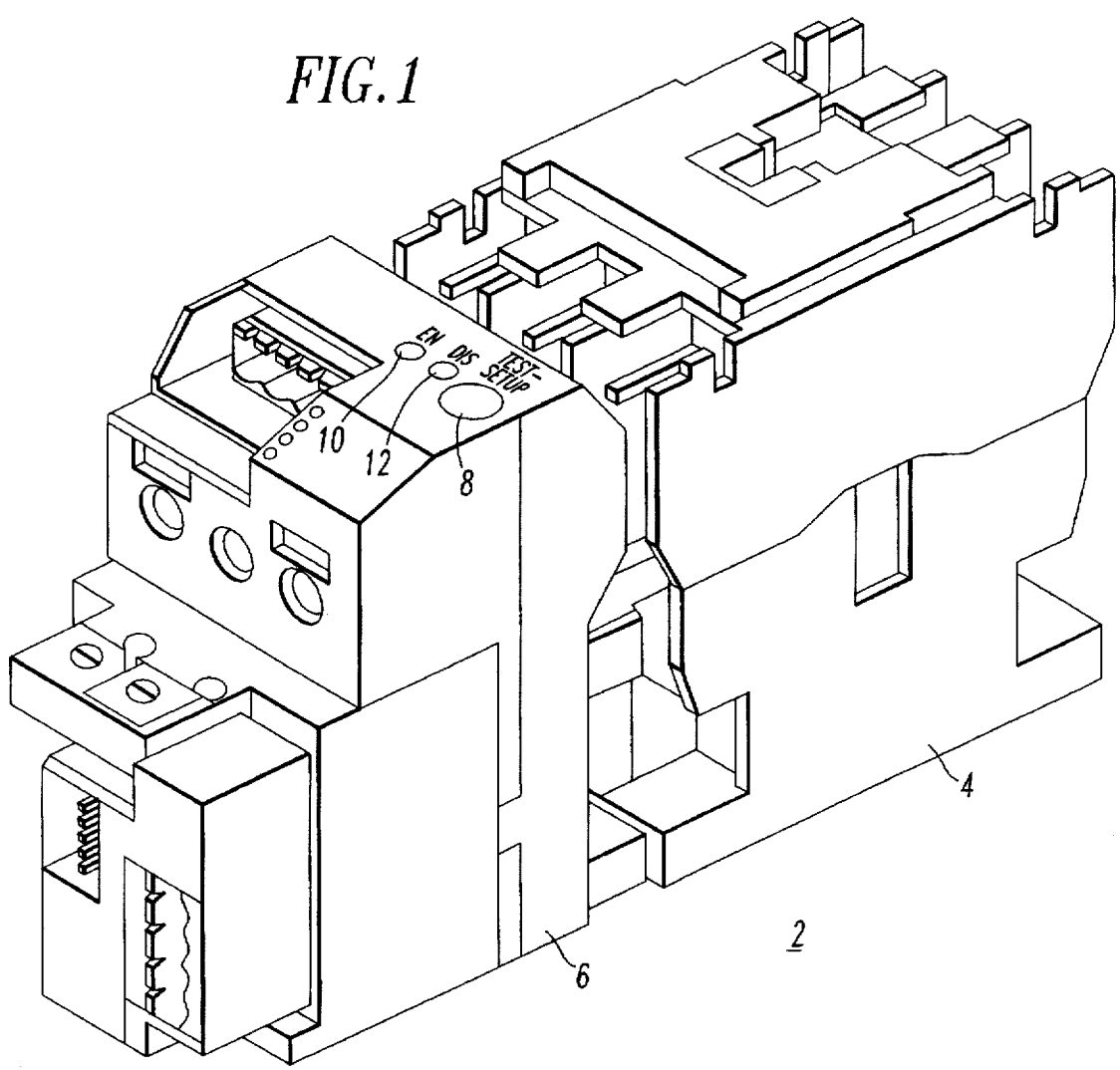
FIG. 1 is an isometric view of a modular electrical contactor and overload relay in accordance with the present invention.

Referring to FIG. 1, a motor starter 2 including a modular electrical contactor 4 and a modular overload relay 6 is illustrated, although the invention is applicable to a wide variety of electrical switching devices including circuit switching devices and circuit interrupters such as circuit breakers, contactors, motor controllers, lighting controllers and other load controllers. The overload relay 6 includes a membrane pushbutton 8 labelled TEST-SETUP and two light emitting diodes (LED's) 10,12 respectively labelled EN,DIS, although the invention is applicable to a wide variety of switches and indicators. The modular contactor 4 and overload relay 6 are disclosed in greater detail in concurrently filed, commonly assigned, copending application Ser. No. 08/558,634, entitled "Motor Control System" (Attorney Docket Number 95-ST2-122(DC)).

Figure 2:
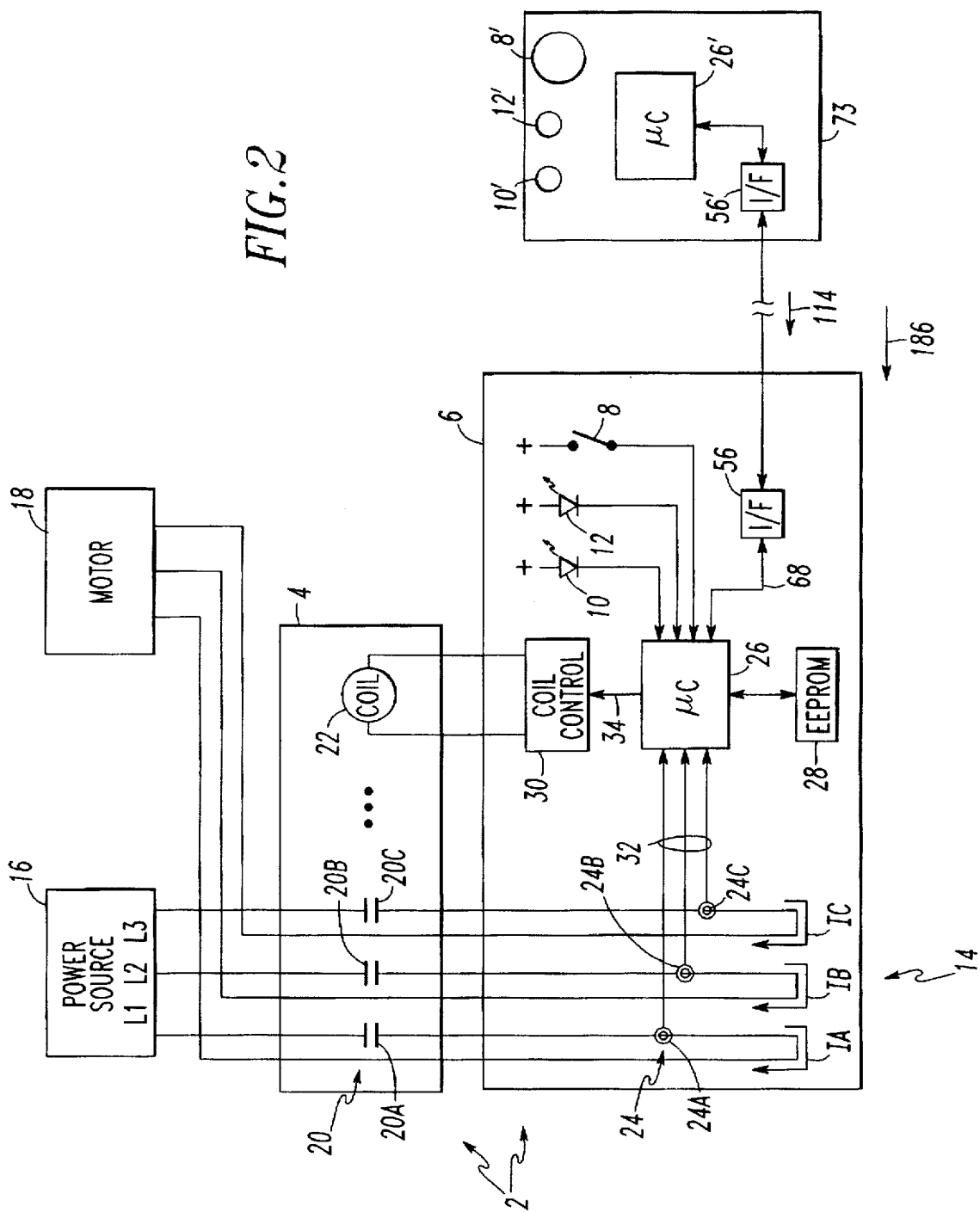
FIG. 2 is a schematic diagram in block form of the electrical contactor and overload relay of FIG. 1.

FIG. 2 illustrates an electrical circuit 14 including a three-phase power source 16 having three phases L1,L2,L3, the contactor 4, the overload relay 6 and a three-phase load such as motor 18, although the invention is applicable to a wide variety of electrical circuits, power sources and loads having any number of phases. The exemplary contactor 4 includes three-phase separable contacts 20 having separable contacts 20A,20B,20C for the respective phases L1,L2,L3. The separable contacts 20A,20B,20C switch electrical currents IA,IB,IC flowing between the power source 16 and the motor 18. The contactor 4 also includes an operating mechanism such as coil 22 which controls opening and closing of the separable contacts 20.

The exemplary overload relay 6 includes a three-phase current sensor 24, a microcomputer (μC) 26, a electrically erasable programmable read only memory (EEPROM) 28 and a coil control circuit 30. The current sensor 24 includes current sensors 24A,24B,24C which sense the electrical currents IA,IB,IC, respectively, flowing between the power source 16 and the motor 18. The current sensor 24 provides three analog sensed current values 32 to the microcomputer 26 which converts the analog values 32 to digital values using an analog-to-digital converter (not shown). As explained in greater detail below in connection with FIGS. 4A–4B and 5–6, the microcomputer 26 controls the open or closed state of the separable contacts 20 with a control signal 34 to the coil control circuit 30 which drives the coil 22.

Figure 3:
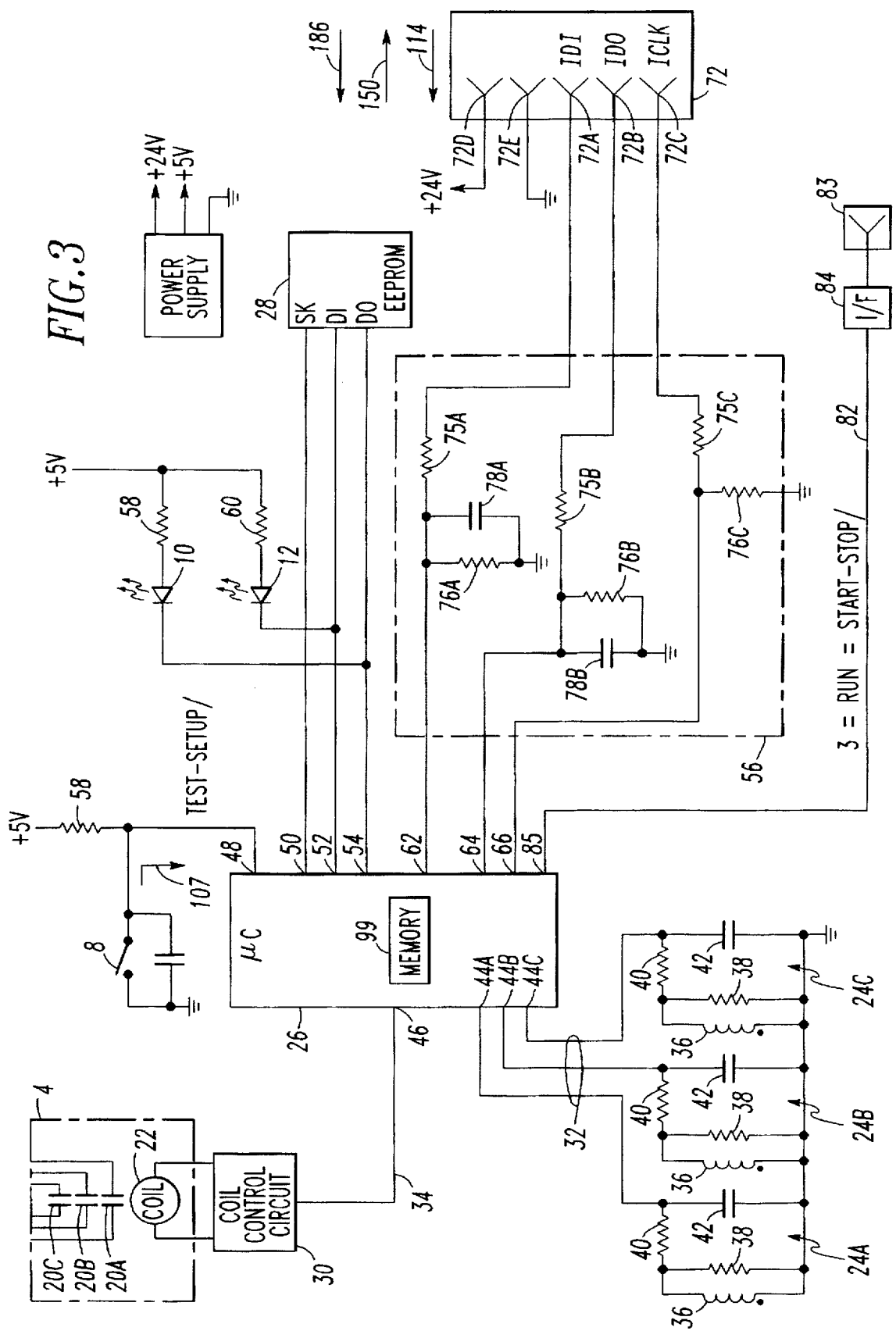
FIG. 3 is a schematic diagram, partially in block form, of the overload relay of FIG. 1 including a microcomputer having an interface to a remote programming device.

Also referring to FIG. 3, each of the exemplary current sensors 24A,24B,24C includes a current transformer 36, a burden resistor 38, a series resistor 40 and a shunt capacitor 42, although the invention is applicable to a wide variety of current sensors for sensing electrical currents. The analog values 32 from the current sensors 24A,24B,24C are input by three analog inputs 44A,44B,44C of the microcomputer 26.

The microcomputer 26 has a digital output 46 for driving the control signal 34 to the coil control circuit 30, a digital input 48, a digital output 50 and digital input/outputs 52,54. The microcomputer 26 interfaces a communication interface 56. The digital input 48 receives a TEST-SETUP/signal from a resistor 58 connected to a logic voltage +5V. The pushbutton 8, when closed, grounds the low-true TEST-SETUP/signal for input by the microcomputer digital input 48. At startup, the microcomputer 26 reads configuration information from serial EEPROM 28 using digital output 50 as a serial clock SK and digital input/output 54 as an input which receives serial output data DO from the EEPROM 28. The microcomputer 26 reprograms the configuration information to serial EEPROM 28 using digital output 50 and digital input/output 52 as an output which sends serial input data DI to EEPROM 28. Following startup, the microcomputer 26 uses digital input/outputs 52,54 as outputs to illuminate the LED's 10,12 by sinking current through resistors 58,60, respectively, which are connected to logic voltage +5V.

Figure 7:
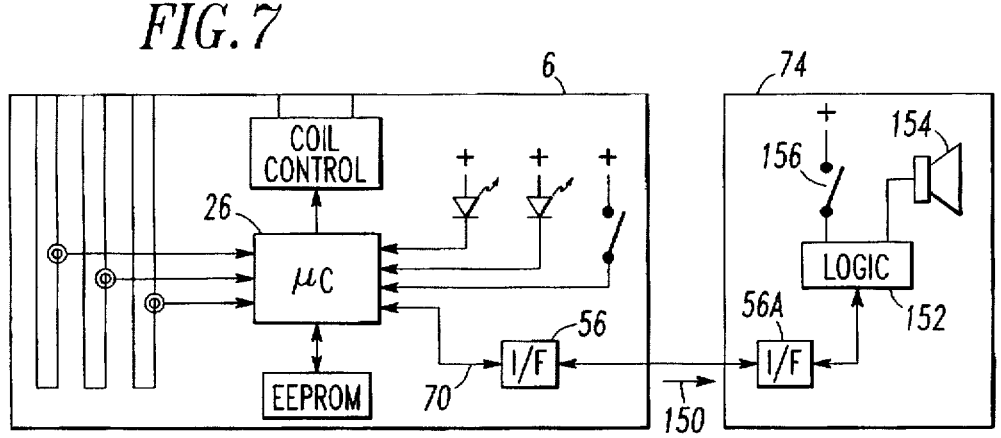
FIG. 7 is a schematic diagram in block form of the overload relay of FIG. 1 including a microcomputer having an interface to a bell alarm.

The microcomputer 26 also includes three pins or terminals 62,64,66 which provide a serial communication interface 68 (shown in FIG. 2) or a discrete control mode communication interface 70 (shown in FIG. 7). With both the serial communication interface 68 and discrete control mode communication interface 70, the terminals 62,64,66 are interconnected with a terminal block 72 by the communication interface 56. In the serial communication interface 68, the terminal 62 inputs serial input data IDI from terminal 72A, the terminal 64 outputs serial output data IDO to terminal 72B and the terminal 66 outputs serial clock ICLK to terminal 72C. On the other hand, in the discrete control mode communication interface 70, each of the terminals 62,64,66 is configured (e.g., an input, an output, an input/output) per application for jointly interfacing a particular communication device. For example, the terminal 62 may input discrete data IDI from terminal 72A, the terminal 64 may output discrete data IDO to terminal 72B and the terminal 66 may input and output data ICLK to and from terminal 72C.

The terminal block 72 also includes terminals 72D,72E which supply power to a communication device such as a bell alarm 74 (shown in FIG. 7) or a pushbutton station (not shown). The communication interface 56 conditions the signals IDI,IDO,ICLK and protects the microcomputer terminals 62,64,66. The communication interface 56 includes resistors 75A,75B,75C, which limit current, and resistors 76A,76B,76C, which limit voltage, at the respective terminals 62,64,66. Capacitors 78A,78B reduce noise at the terminals 62,64, respectively.

Figure 4A:
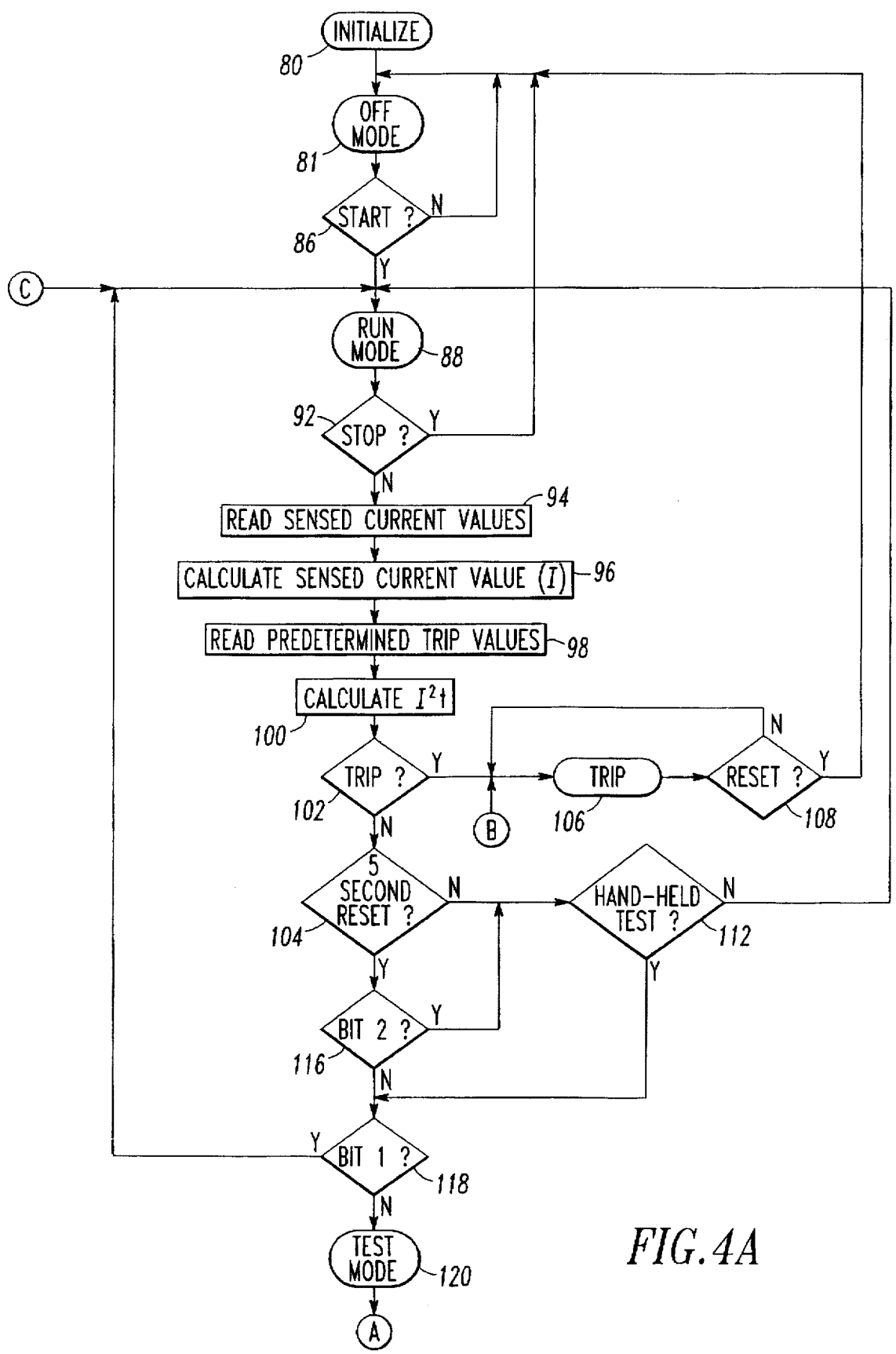
FIGS. 4A and 4B are flowcharts of a firmware routine of the microcomputer of FIG. 3.

Also referring to FIG. 4A, a flowchart of a firmware routine of the microcomputer 26 of FIG. 3 is illustrated. After initialization at step 80, the overload relay 6 of FIG. 1 enters an off mode at step 81 until the signal 82 is true (i.e., when the signal 3=RUN=START-STOP/represents a start command) and is received at step 86. As shown in FIG. 3, the signal 82 is converted from a control voltage at terminal 83 by an interface (I/F) 84 to a logic level signal at a digital input 85 of the microcomputer 26. Otherwise, if the signal 82 is false, step 81 is repeated. After receiving the start command at step 86, the overload relay 6 enters a run mode at step 88. When the signal 82 is false (i.e., when the signal 3=RUN=START-STOP/represents a stop command) and is received at step 92, step 81 is repeated. Otherwise, at step 94, the microcomputer 26 reads three digital sensed current values from the analog-to-digital converter (not shown) which converts the three analog sensed current values 32 at the analog inputs 44A,44B,44C. At step 96, a maximum sensed current value (I) of the current values read at step 94 is determined. At step 98, a plurality of predetermined values are read from a memory 99 of the microcomputer 26. These values are defined below in Table I.

TABLE I

| VALUE | DEFINITION |
|---|---|
| $I_{RATED}$ | rated load current (e.g., rated motor current) |
| COOL | cooling factor for $I < I_{RATED}$ |
| COOLING ADJUSTMENT | $(COOL \times I_{RATED})^2$ |
| CLASS | time (seconds) to operate at six times rated load current |
| UPDATE_FREQUENCY | number of $I^2t$ calculations per second |
| TRIP_LEVEL | $(I_{RATED})^2 \times CLASS \times UPDATE\_FREQUENCY$ |

Continuing to refer to FIGS. 3 and 4A, at step 100, an $I^2t$ TOTAL is calculated as follows. The maximum sensed current value (I) is compared to the rated load current ($I_{RATED}$). If I is less than $I_{RATED}$, the $I^2t$ TOTAL is updated by subtracting the COOLING ADJUSTMENT, which reflects cooling of the motor 18, from the previously calculated $I^2t$ TOTAL. On the other hand, if I is greater than or equal to $I_{RATED}$, the $I^2t$ TOTAL is updated by adding a factor, $(I)^2$, which reflects heating of the motor 18. Next, at step 102, the $I^2t$ TOTAL is compared to the TRIP_LEVEL. If the $I^2t$ TOTAL is less than the TRIP_LEVEL, there is no trip and execution continues at step 104. On the other hand, if the $I^2t$ TOTAL is greater than or equal to the TRIP_LEVEL, a trip mode is entered at step 106 and the coil 22 is de-energized by the microcomputer 26. The overload relay 6 remains in the trip mode until the digital input 48 is low (i.e., when the signal TEST-SETUP/represents a reset command 107 with the actuation of pushbutton 8) and is received at step 108, although the invention is applicable to other reset commands (not shown) such as an automatic reset command generated after a thermal trip or other reset commands received by the serial communication interface 68 of FIG. 2 or the discrete control mode communication interface 70 of FIG. 7. The reset command 107 causes the off mode to be re-entered at step 81. Otherwise, the overload relay 6 remains in the trip mode at step 106.

If there was no trip, at step 104, the microcomputer 26 determines whether the pushbutton 8 is depressed for at least 5 seconds. If so, entry into a test mode has been manually requested by a user. Otherwise, at step 112, the microcomputer 26 determines whether a test mode command 114 is received from the hand-held programmer 73 of FIG. 2. If not, execution resumes at step 88 and steps 88,92,94,96,98, 100,102,104,106,108,112 are repeated as discussed above.

At the initialization step 80, discussed above, the microcomputer 26 reads various configuration parameters from the EEPROM 28 including the values defined in Table I above and the values defined in Table II below. All of these values are then stored in the memory 99.

TABLE II

| VALUE | DEFINITION |
|---|---|
| BIT 1 | Disable all test modes |
| BIT 2 | Disable manual test mode entry |
| BIT 3 | Disable tripping of separable contacts in the test mode |
| BIT 4 | Disable simulated sensed current test mode |
| BIT 5 | Disable reduced trip current value test mode |

When manual entry into the test mode is requested, at step 116, if BIT 2 is true, the test mode is not entered and the microcomputer 26 determines whether the hand-held programmer test mode command 114 is received at step 112. Otherwise, if any test mode command is received at steps 104, 116 or step 112, at step 118, if BIT 1 is true, the test mode is not entered and execution resumes at step 88. Otherwise, the test mode is entered at step 120.

Figure 4B:
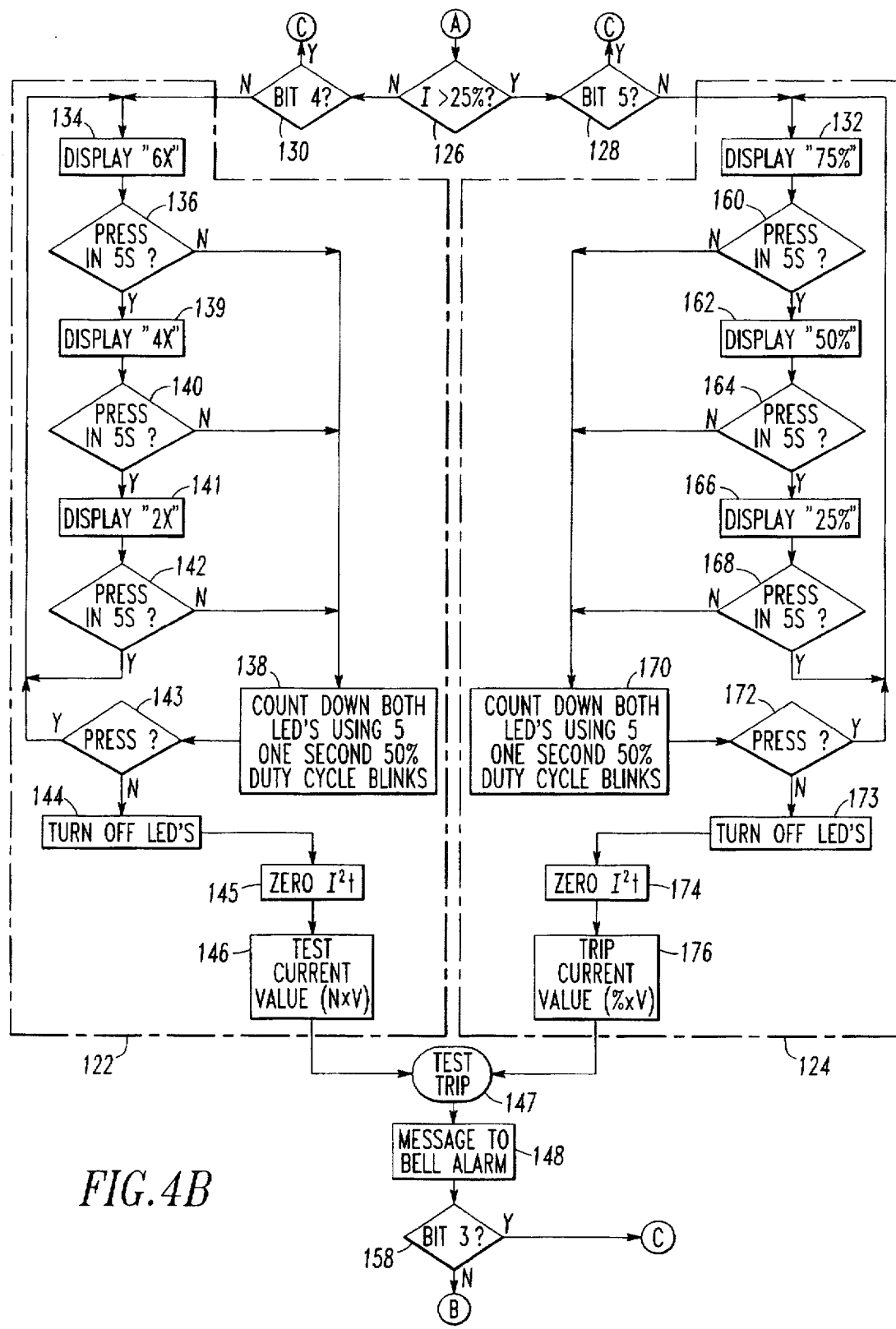

Referring to FIGS. 3 and 4B, the test mode includes a simulated sensed current test mode 122, which is disabled by BIT 4, and a reduced trip current value test mode 124, which is disabled by BIT 5. Those skilled in the art will appreciate that: (1) only test mode 122 (BIT 4=0, BIT 5=1); (2) only test mode 124 (BIT 4=1, BIT 5=0); (3) both test modes 122,124 (BIT 4=BIT 5=0); or (4) no test modes 122,124 (BIT 4=BIT 5=1) may be preselected by BIT 4 and BIT 5 as well as by other equivalent programming techniques in which microcomputer code for none, one or both of the test modes 122,124 is provided.

At step 126, the maximum sensed current value (I) is compared to 25% of the rated motor current ($I_{RATED}$). If I is greater than 25% of $I_{RATE}$, entry into the test mode 124 is checked at step 128. Otherwise, entry into the test mode 122 is checked at step 130. At step 128, if BIT 5 is true, execution continues at step 88 of FIG. 4A. On the other hand, if BIT 5 is false, the test mode 124 is entered at step 132. Similarly, at step 130, if BIT 4 is true, execution continues at step 88. On the other hand, if BIT 4 is false, the test mode 122 is entered at step 134. The states of the test modes 122,124, which are displayed on the LED's 10, 12 as shown in Table III, are discussed in greater detail below.

TABLE III

| TEST MODE 122 STATE | TEST MODE 124 STATE | LED 10 | LED 12 |
|---|---|---|---|
| 6X SENSED CURRENT | 75% TRIP CURRENT | on | on |
| 4X SENSED CURRENT | 50% TRIP CURRENT | on | off |
| 2X SENSED CURRENT | 25% TRIP CURRENT | off | on |
| STATE SELECTED | STATE SELECTED | blink | blink |
| START OF MODE 122 TEST | START OF MODE 124 TEST | off | off |

At step 134, state "6X" is displayed by turning both LED's 10,12 on. At step 136, if the microcomputer 26 detects that pushbutton 8 is not pressed in for (i.e., is de-actuated within) 5 seconds, step 138 is executed. Otherwise, state "4X" is displayed on the LED's 10, 12 at step 139 as described by Table III. At step 140, if pushbutton 8 is not pressed in for 5 seconds, step 138 is executed. Otherwise, state "2X" is displayed at step 141 as described by Table III. At step 142, if pushbutton 8 is not pressed in for 5 seconds, step 138 is executed. Otherwise, step 134 is repeated.

At step 138, after one of the states "6X," "4X" or "2X" is selected by detecting no actuation of the pushbutton 8 during one of the corresponding steps 136, 140 or 142, the LED's 10, 12 are both blinked on and off using five, one second, 50 duty cycle blinks. In this manner, an operator is informed that the subsequently described test is imminent. During or immediately after step 138, if the pushbutton 8 is pressed at step 143, execution resumes at step 134 and state "6X" is redisplayed. Otherwise, at step 144, the LED's 10,12 are both turned off. At step 145, the $I^2t$ TOTAL of step 100 of FIG. 4A is zeroed and, at step 146, a test current value (N×V) is determined by multiplying the selected one (N) of the exemplary integers two, four or six associated with the corresponding states "2X," "4X" or "6X" times the rated motor current (V=$I_{RATED}$). At step 147, a test trip routine is executed. This test trip routine is generally the same as the steps 94,96,98,100,102 of FIG. 4A, except that the test current value (N×V) of step 146 is substituted for the maximum sensed current value (I) of step 96, or the trip current value (%×V) of step 176 (discussed below) is substituted for the rated motor current ($I_{RATED}$) and is used to provide a simulated TRIP_LEVEL as discussed below with FIG. 6.

In the test mode 122, because the test current value (N×V) is, by definition, greater than the rated motor current ($I_{RATED}$) by a preselected amount (i.e., 2X, 4X or 6X), a trip will be detected in a known predetermined time. At step 148, if a bell alarm 74 is interconnected with the overload relay 6 (shown in FIG. 7), a trip message 150 from the microcomputer 26 through discrete control mode communication interface 70 and interface 56 is received by interface 56A and logic 152 of the bell alarm 74. The logic 152 annunciates the trip using an annunciator 154 such as a bell, speaker, light or other audio and/or visual indicator. In turn, the operator acknowledges the trip using a pushbutton 156 of the bell alarm 74. At step 158, if BIT 3 is false, the trip mode is entered at step 106 of FIG. 4A, the coil 22 is de-energized and the separable contacts 20 are opened by the control signal 34 which acts as a trip signal. On the other hand, if BIT 3 is true, the run mode is continued at step 88 and the state of the separable contacts 20 is not changed by the test mode 122 (or the test mode 124).

Step 148 generates one trip signal 150 which is enunciated by the bell alarm 74 of FIG. 7. If BIT 3 is false, step 106 of FIG. 4A generates another trip signal 34 which controls the coil control circuit 30 and opens the separable contacts 20 in response to the signal 34. If BIT 3 is true, step 158 disables the trip signal 34 in order that the modes 122,124 do not trip open the separable contacts 20.

Steps 132,160,162,164,166,168,170,172,173,174,176 of test mode 124 are generally the same as steps 134,136,139, 140,141,142,138,143,144,145,146, respectively, of test mode 122. One of the differences being that steps 132,162, 166 display states "75%," "50%" and "25%" in place of states "6X," "4X" and "2X" of steps 134,139,141, respectively. Also, at step 176, a trip current value (%×V) is determined by multiplying the exemplary fractions ¾, ½ or ¼ associated with the corresponding states "75%," "50%" or "25%" times the rated motor current (V=$I_{RATED}$). After step 176, the test trip routine 147 is executed.

During the test mode 124, the operator preferably knows the actual maximum sensed current value (I) of step 96 of FIG. 4A. For example, the phases L1,L2,L3 of the power source 16 of FIG. 2 have known power line voltages and the motor 18 may have a current meter (not shown) associated therewith for display of one or more of the motor currents IA,IB,IC, or a known fixed load may be substituted for the motor 18 in order to provide a predetermined load current given the known power line voltages. The operator selects, by releasing the pushbutton 8 at one of steps 160,164,168, the trip current value (%×V) to be less than the known actual maximum sensed current value (I). In this manner, a trip is detected by step 147 in a known predetermined time.

In summary, under normal trip operation at steps 94,96, 98,100,102 of FIG. 4A, the maximum sensed current value (I) is compared with the rated motor current ($I_{RATED}$). In the test mode 122, a larger (i.e., 2X, 4X or 6X) test current value (N×V) is utilized with the smaller rated motor current (V=$I_{RATED}$). In the test mode 124, the known larger maximum sensed current value (I) is utilized with the selected smaller trip current value (%×$I_{RATED}$).

In both of the test modes 122,124, the user may consult predefined trip tables to determine the expected trip time. Using the count down of both the blinking LED's 10,12 at steps 138,170 followed by the extinguishing of both the LED's 10,12 at steps 144,173, respectively, the user may compare the expected trip time from the predefined trip tables with the actual trip time. The user determines the actual trip time by measuring the time after the LED's 10, 12 are extinguished at steps 144 or 173 until the trip. The trip is annunciated, for example, at the bell alarm 74 of FIG. 7 by step 148, although the invention is applicable to other mechanisms for annunciating a trip such as the LED indicators 10,12 or by a remote transmission to another enunciation device such as the programmer 73 of FIG. 2.

The test modes 122,124 both test the predefined $I^2t$ trip response and the predefined parameters such as the rated load current ($I_{RATED}$), CLASS and TRIP_LEVEL of the motor starter 2. Furthermore, the test mode 124 tests the operation of the current sensors 24 and microcomputer analog inputs 44A,44B,44C. Steps 138,144 indicate when the test current value ($N \times I_{RATED}$) is selected in order that the user may verify the $I^2t$ function. Similarly, steps 170,173 indicate when the trip current value ($\% \times I_{RATED}$) is selected in order that the user may verify the $I^2t$ function and the current sensors 24. Preferably, the tests with the test modes 122,124 are conducted with the motor current IA,IB,IC having a steady state value.

Figure 5:
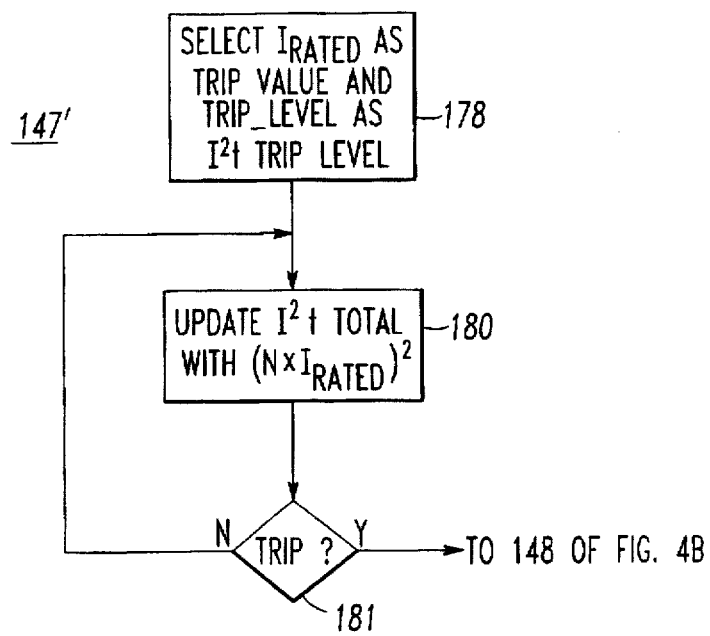
FIG. 5 is a flowchart of another firmware routine of the microcomputer of FIG. 3 in accordance with an alternative embodiment of the present invention.
Figure 6:
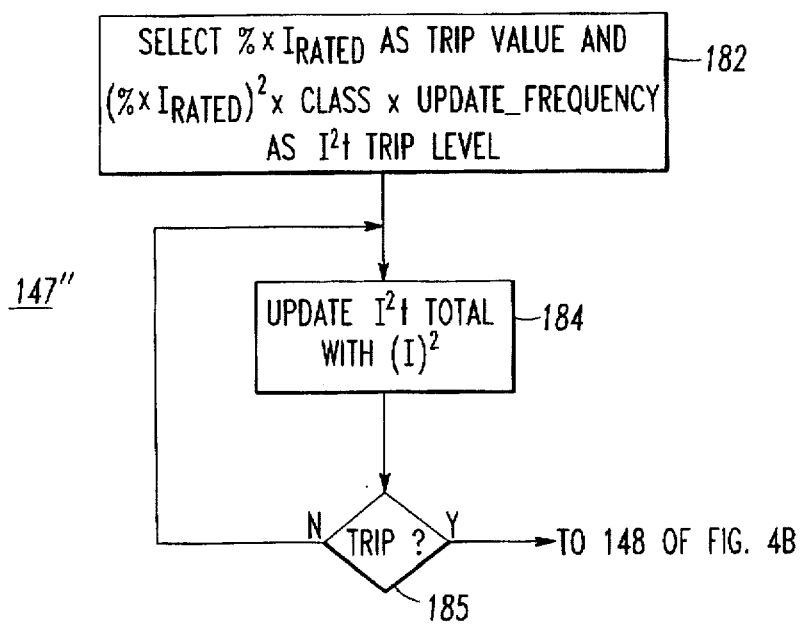
FIG. 6 is a flowchart of another firmware routine of the microcomputer of FIG. 3 in accordance with another alternative embodiment of the present invention.

FIGS. 5 and 6 respectfully illustrate embodiments of the invention in which only test mode 122 (BIT 4=0, BIT 5=1) and only test mode 124 (BIT 4=1, BIT 5=0) are provided. In FIG. 5, the overload relay 6 of FIGS. 2 and 7 generates the trip signals 34,150 as a function of: (1) a trip current value, which is the rated load current ($I_{RATED}$), and the maximum sensed current value (I) at step 100 of FIG. 4A; and (2) the trip current value ($I_{RATED}$) and a simulated sensed current value ($N \times I_{RATED}$), which is determined at step 146 of FIG. 4B as a multiple of the rated motor current ($I_{RATED}$).

Referring to FIGS. 2, 4A–4B and 7, in the exemplary embodiments, the motor 18 has a motor current IA,IB,IC and a name plate current ($I_{RATED}$) which is the rated motor current ($I_{RATED}$). The microcomputer 26 of the overload relay 6 generates the trip signals 34,150 as an $I^2t$ time related function of the rated motor current ($I_{RATED}$) and the maximum sensed current (I). As discussed above with FIG/ 4A, step 100 selects the predetermined trip value ($I_{RATED}$) for use with the maximum sensed current value (I). As discussed above with FIG. 4B, the test mode 122 selects, at steps 136,140,142,146, the test current value or simulated sensed current value ($N \times I_{RATED}$) from a plurality of predetermined values ($6 \times I_{RATED}, 4 \times I_{RATED}, 2 \times I_{RATED}$). Steps 136,140,142 select one (N) of the integer constants six, four and two, although the invention is applicable to a wide variety of selection mechanisms for selecting any number greater than one. Step 146 determines the test current value as the product of the predetermined trip value ($I_{RATED}$) times the selected constant (N).

Also referring to FIG. 5, an alternative test trip function 147', which follows step 146 of FIG. 4B, includes steps 178, 180 and 181. At step 178, the rated load current ($I_{RATED}$) of the motor 18 is selected as the predetermined trip value and TRIP_LEVEL is selected as the $I^2t$ trip level for step 181. The simulated sensed current value ($N \times I_{RATED}$) is, by definition, greater than the rated load current ($I_{RATED}$). At step 180, the $I^2t$ TOTAL is updated by adding a factor, ($N \times I_{RATED}$)$^2$, which reflects a simulated heating of the motor 18. At step 181, if the $I^2t$ TOTAL is less than TRIP_LEVEL, there is no trip and execution continues at step 180 in order to accumulate the $I^2t$ TOTAL according to the predefined UPDATE_FREQUENCY. On the other hand, if the $I^2t$ TOTAL is greater than or equal to TRIP_LEVEL, the trip is detected, and execution continues as shown at step 148 of FIG. 4B.

Continuing to refer to FIGS. 2, 4A–4B and 7, in the alternative embodiment of FIG. 6, the overload relay 6 generates the trip signals 34,150 as a function of: (1) a trip current value, which is the rated load current ($I_{RATED}$), and the maximum sensed current value (I) at step 100 of FIG. 4A; and (2) a selected trip current value or test value ($\% \times I_{RATED}$) and the maximum sensed current value (I). As discussed above with FIG. 4B, the test mode 124 selects at steps 160,164,168,176 the trip current value ($\% \times I_{RATED}$) from a plurality of predetermined values (75% of $I_{RATED}$, 50% of $I_{RATED}$, 25% of $I_{RATED}$). Steps 160,164,168 select one (%) of the fractional constants 75%, 50% and 25%, although the invention is applicable to a wide variety of selection mechanisms for selecting any number less than one. Step 176 determines the selected trip current value as the product of the predetermined trip value ($I_{RATED}$) times the selected constant (%).

As shown in FIG. 6, an alternative test trip function 147", which follows step 176 of FIG. 4B, includes steps 182, 184 and 185. The sensed current value I is, by definition, less than the selected trip current value ($\% \times I_{RATED}$). At step 182, the trip current value ($\% \times I_{RATED}$) is selected as the test value, and the $I^2t$ trip level for step 185 (i.e., a simulated TRIP_LEVEL) is selected to be ($\% \times I_{RATED}$)$^2 \times$ CLASS $\times$ UPDATE_FREQUENCY. At step 184, the $I^2t$ TOTAL is updated by adding a factor, (I)$^2$, which reflects heating of the motor 18. At step 185, if the $I^2t$ TOTAL is less than the simulated TRIP_LEVEL, there is no trip and execution continues at step 184 in order to accumulate the $I^2t$ TOTAL according to the predefined UPDATE_FREQUENCY. On the other hand, if the $I^2t$ TOTAL is greater than or equal to simulated TRIP_LEVEL, the trip is detected, and execution continues as shown at step 148 of FIG. 4B.

Referring to FIG. 2, the hand-held programmer 73 is generally remote with respect to the separable contacts 20 and the overload relay 6. The programmer 73 includes a switch 8', LED's 10',12', microcomputer 26', and interface 56' which are similar to the respective switch 8, LED's 10, 12, microcomputer 26 and interface 56 of the overload relay 6. The interface 56' provides a hand-held programmer mechanism for communicating with the overload relay interface 56. The switch 8', LED's 10', 12', microcomputer 26' and interface 56' generate the test mode command 114 as discussed above with FIG. 4A and, also, generate other commands 186 which select, as discussed above with the test modes 122,124 of FIG. 4B: (a) the test current value ($N \times I_{RATED}$) for use with the rated motor current ($I_{RATED}$) and (b) the trip current value ($\% \times I_{RATED}$) for use with the maximum sensed current value I. As discussed with FIG. 4A, the local pushbutton 8 is disabled by step 116 of FIG. 4A if BIT 2 is true. In this case, selection of the test modes 122,124 is provided by the hand-held programmer 73.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A motor starter for an electrical circuit including a power source and a load, said motor starter indicating selection of a value to a user, said motor starter comprising:

electrical contactor means including separable contact means for switching an electrical current flowing between said power source and said load, and operating means responsive to a trip signal for opening and closing said separable contact means;

means for sensing the electrical current flowing between said power source and said load and providing a sensed current value therefrom; and overload relay means including:
    means for generating the trip signal as a time related function of:
      (a) a trip current value and a test current value, and
      (b) the trip current value and the sensed current value; and
    test means including at least one of:

(a) first selecting means including means for selecting a first predetermined value as the trip current value and means for selecting the test current value for use by said means for generating the trip signal with the trip current value, and first means for indicating to the user when the test current value is selected in order that the user may verify said time related function, and (b) second selecting means for selecting one of at least one second predetermined value as the trip current value for use by said means for generating the trip signal with the sensed current value, and second means for indicating to the user when the second predetermined value is selected as the trip current value in order that the user may verify said time related function.

2. The motor starter as recited in claim 1 wherein the means for selecting the test current value includes means for selecting the test current value from a plurality of predetermined values.

3. The motor starter as recited in claim 2 wherein the means for selecting the test current value from the predetermined values includes means for selecting one of a plurality of constants and means for determining the test current value as a function of the first predetermined value times the selected constant.

4. The motor starter as recited in claim 3 wherein the constants include a plurality of integers which are greater than one.

5. The motor starter as recited in claim 1 wherein said test means includes at least said first selecting means; and wherein said test means further includes means for comparing the sensed current value with a predetermined current value and means for employing the first selecting means when the sensed current value is less than the predetermined current value.

6. The motor starter as recited in claim 5 wherein the first selecting means further includes means for selecting one of a plurality of numbers and means for determining the test current value as a function of the first predetermined value times said one number.

7. The motor starter as recited in claim 1 wherein said test means includes at least said second selecting means; and wherein the second selecting means includes means for selecting the trip current value from a plurality of second predetermined values, which are different from the first predetermined value.

8. The motor starter as recited in claim 7 wherein the means for selecting the trip current value includes means for selecting one of a plurality of constants and means for determining the trip current value as a function of the first predetermined value times the selected constant.

9. The motor starter as recited in claim 8 wherein the constants include a plurality of fractions which are less than one.

10. The motor starter as recited in claim 1 wherein said test means includes at least said second selecting means; and wherein said test means further includes means for comparing the sensed current value with a predetermined current value and means for employing the second selecting means when the sensed current value is greater than the predetermined current value.

11. The motor starter as recited in claim 10 wherein the second selecting means includes means for selecting one of a plurality of numbers and means for determining the trip current value as a function of the first predetermined value times said one number.

12. The motor starter as recited in claim 1 wherein said means for generating the trip signal includes means for generating the trip signal as a function of the first predetermined value and the sensed current value; and wherein said overload relay means further includes means for disabling said test means.

13. The motor starter as recited in claim 1 wherein said overload relay means further includes first remote communication means; wherein said test means further includes remote means remote with respect to said separable contact means, with the remote means including second remote communication means for communication with the first remote communication means; wherein said test means also includes local means local with respect to said separable contact means, with the local means and the remote means for selecting: (a) the test current value for use with the trip current value and (b) the trip current value for use with the sensed current value; and wherein said overload relay means also includes means for disabling the local means.

14. The motor starter as recited in claim 1 wherein the trip signal includes a first trip signal and a second trip signal; wherein said operating means responsive to the trip signal includes means for opening said separable contact means in response to the first trip signal and means for enunciating the second trip signal; wherein said means for generating the trip signal includes means for generating the first trip signal as a function of the first predetermined value and the sensed current value; and wherein said overload relay means further includes means for disabling the first trip signal in order that the selection of one of the test current values and the trip current value by said test means does not trip open said separable contact means.

15. A motor starter for an electrical circuit including a power source and a load, said motor starter comprising:

electrical contactor means including separable contact means for switching an electrical current flowing between said power source and said load, and operating means responsive to a trip signal for opening and closing said separable contact means;

means for sensing the electrical current flowing between said power source and said load and providing a sensed current value therefrom; and overload relay means including:
means for generating the trip signal as a time related function of a trip current value and one of the sensed current value and a test current value, test means for selecting the test current value from at least one predetermined value, each of which is different from the trip current value, for use by said means for generating the trip signal with the trip current value, and means for indicating to a user when the test current value is selected in order that the user may verify said time related function.

16. The motor starter as recited in claim 15 wherein said test means includes means for selecting one of a plurality of integers and means for determining the test current value as a product of the selected integer and the trip current value.

17. The motor starter as recited in claim 16 wherein the load is a motor having a motor current and a name plate current; wherein the load current is the motor current; wherein the trip current value is the name plate current; wherein the test current value is a multiple of the name plate current; and wherein said means for generating the trip signal further includes means for increasing an $I^2t$ value by a predetermined value.

18. An electrical switching device for an electrical circuit including a power source and a load, said electrical switching device comprising:

separable contact means for switching an electrical current flowing between said power source and said load, said separable contact means having a closed position and an open position;

means responsive to a trip signal for moving said separable contact means from the closed position to the open position;

means for sensing the electrical current flowing between said power source and said load and providing a sensed current value therefrom;

means for generating the trip signal as a function of the sensed current value and one of a predetermined trip current value and a selected trip current value; and test means for selecting the selected trip current value from at least one predetermined test value, each of which is less than the predetermined trip current value, for use by said means for generating the trip signal with the sensed current value which is less than the predetermined trip current value.

19. The electrical switching device as recited in claim 18 wherein said test means includes means for selecting one of a plurality of fractions and means for determining the selected trip current value as a product of the selected fraction and the predetermined trip current value.

20. The electrical switching device as recited in claim 18 wherein said means for generating the trip signal includes means for generating the trip signal as a time related function of the selected trip current value and the sensed current value; and wherein said test means further includes means for indicating when the selected trip current value is selected in order that a user may verify said time related function and said means for sensing the electrical current.

21. The electrical switching device as recited in claim 20 wherein said electrical switching device is a motor starter; wherein the load is a motor having a motor current and a name plate current; wherein the load current is the motor current; wherein the predetermined trip current value is the name plate current; wherein the selected trip current value is a fraction of the name plate current; and wherein said means for generating the trip signal includes means for comparing an $I^2t$ value with a simulated trip level value.

* * * * *